H. W. FISHER AND R. W. ATKINSON.
METHOD OF FILLING THE INSULATION OF HOLLOW CABLES AND PRODUCT THEREOF.
APPLICATION FILED AUG. 28, 1920.
1,418,369.
Patented June 6, 1922.
2 SHEETS—SHEET 1.
FIG. I.
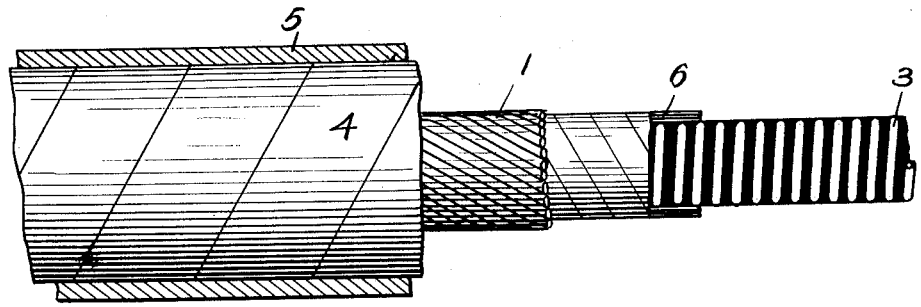
FIG. II.
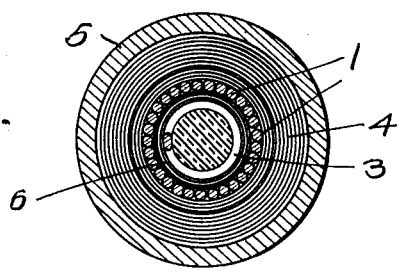
FIG. III.
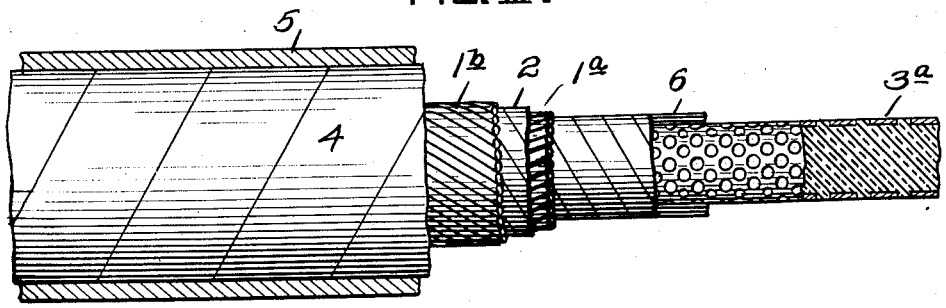
FIG. IV.
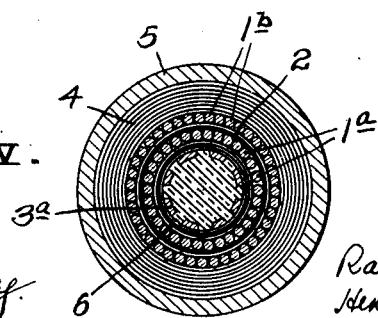
WITNESSES
J. Herbert Bradley
Nancy J. Townsson
INVENTOR
Ralph W. Atkinson and
Henry W. Fisher
by Christy and Christy
their attorneys FIG. V.
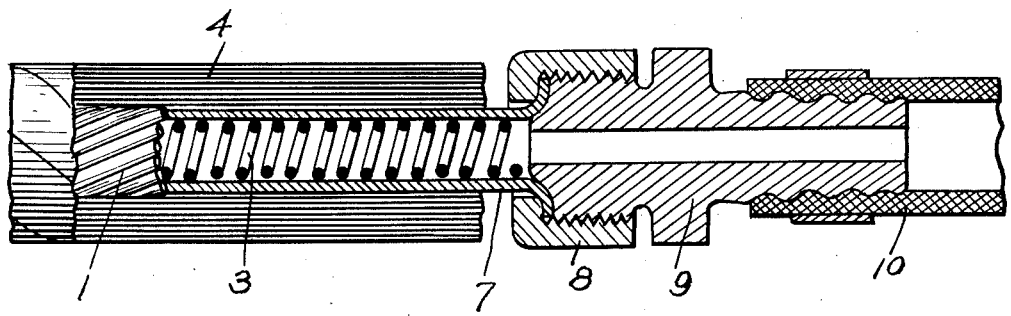
FIG. VI.
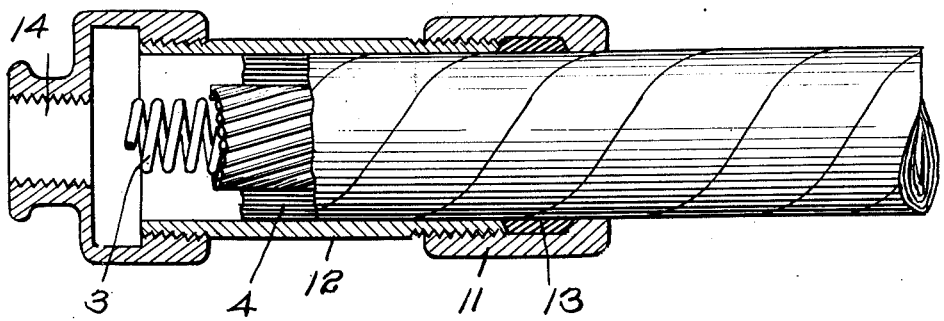

UNITED STATES PATENT OFFICE.

HENRY W. FISHER AND RALPH W. ATKINSON, OF PERTH AMBOY, NEW JERSEY, ASSIGNORS TO STANDARD UNDERGROUND CABLE COMPANY, OF PITTSBURGH, PENNSYLVANIA, A CORPORATION OF PENNSYLVANIA.

METHOD OF FILLING THE INSULATION OF HOLLOW CABLES AND PRODUCT THEREOF.

1,418,369. Specification of Letters Patent. Patented June 6, 1922.

Application filed August 28, 1920. Serial No. 406,653.

*To all whom it may concern:*

Be it known that we, HENRY W. FISHER and RALPH W. ATKINSON, residing at Perth Amboy, in the county of Middlesex and State of New Jersey, both citizens of the United States, have invented or discovered certain new and useful Improvements in the Methods of Filling the Insulation of Hollow Cables and Product Thereof, of which improvements the following is a specification.

Our invention relates to improvements in the construction of electric cables; its object is to produce a cable peculiarly well adapted to endure the strains of high-voltage service.

The invention is illustrated in the accompanying drawings. Fig. I is a view partly in side elevation, partly in longitudinal section, of a cable embodying in its structure our present invention. For purposes of illustration the cable is here shown in a diagrammatic manner, partially dissected. Fig. II is a view of the same cable in cross section. Figs. III and IV are corresponding views of another cable, differently constructed in detail, but still embodying our invention. Figs. V and VI are views in longitudinal section illustrating in alternate forms a temporary connection, serviceable in the practice of our method as will hereinafter be described.

Hollow cables are desirable to meet various service conditions; such a cable is shown and described in U. S. Letters Patent No. 873,216, granted to the Standard Underground Cable Company, on the application of Charles W. Davis; such a cable is described in our pending application for Letters Patent of the United States, filed July 3, 1920, Serial No. 393,574. In these prior specifications certain advantages of hollow cables are dwelt upon. We do not cite these as exhaustive in their enumeration of advantages, but they are for present purposes sufficient. We are concerned with increasing in the greatest possible degree the dielectric strength of the insulation of a hollow cable.

The insulation employed in the practice of our invention consists essentially of a permeable body, such, for example, as a wrapped-on body of paper in strip or ribbon form, and a permeating body, such, for example, as a heavy petroleum residue, which may be applied in liquid form and which under service conditions may be either liquid or viscid. The significance in this art of the word heavy in the phrase "heavy petroleum residue" concerns degree of viscosity; a heavy residue is one which being applied will not readily become displaced by heating to the higher limits of service temperature — service temperature ordinarily means atmospheric temperature and upward, to as much as 150° to 160° F.

The conductor of the cable is preferably tubular in form, surrounding the essential hollow central space; it is permeable by the liquid component of the insulation already alluded to; and it ordinarily will consist of a plurality of wires or strands grouped in tubular shape, between the individual components of which the liquid insulation may pass. It will be understood that the components may be parts of a compound single conductor, or the component wires may be so insulated individually or in groups and so connected as to constitute the cable a multiple-conductor cable. In Figs. I and II of the drawings the annular conductor is indicated at 1; it consists of a plurality of wires stranded together in the form of a hollow tube. Such a stranding is never so close, but that the liquid component of the insulation may pass through. In Figs. III and IV the conductor consists of concentric rings 1ª and 1ᵇ, each composed of a plurality of wires stranded as in Figs. I and II. Ordinarily it is not necessary to separate the rings 1ª and 1ᵇ, one from another. But to meet particular needs, as, for example, to produce a "split-conductor" cable (serviceable, when installed with proper apparatus, to automatically put out of service the length of cable, in case of a break-down in insulation), then the two rings 1ª and 1ᵇ may be insulated one from another by a layer of insulation 2.

Ordinarily, the annular conducting body will be built up on a hollow core structure, which core structure also will itself be permeable by the fluid component of the insulation. This core structure of the cable of Figs. I and II of the drawings, for example, consists of an open helix 3 of wire, between the successive turns of which the liquid component of the insulation may freely pass. In Figs. III and IV we show instead a tubular core structure 3ª formed of sheet metal and provided with perforations.

The essential body of insulation consists, as has been said, of a rigid permeable structure, such as wrapped-on paper, which in the course of cable-building is permeated with such a liquid as a heavy petroleum derivative. This essential body of insulation is in the drawings indicated at 4.

A protecting sheath 5 of lead or other material may envelope the cable exteriorly. As will be understood, if a sheath is to be applied which is impermeable, it will ordinarily be applied only after the cable is, by the operations which we are about to describe, otherwise completed.

It is to be observed that when one has to do with a hollow cable, the main body of insulation 4 (which consists, as has been said, essentially of a permeable substance) is accessible from both sides, from the side adjacent the conductor as well as from the exterior, for purposes of permeation. The only limitation being that the hollow conductor shall itself be permeable, as it will be when it is made of a plurality of wires. The body of solid and permeable insulation material being so accessible upon both sides, it becomes possible to effect permeation from either side at will and from side to side, to maintain upon the two sides such different degrees of pressure as shall expedite permeation and make it more thorough and effective, and to introduce succeeding bodies of permeating material, differing one from another in physical characteristics and in their character as dielectrics, and so by the introduction of a succession of "waves" to build up within the permeable body a compound permeating body, graded to suit electric conditions.

The fundamental idea then is, first of all, that of a hollow conductor enveloped in paper (or its equivalent), into which envelope insulating compound can be carried from side to side, the permeating compound entering the fibrous envelope from one side and displacing the air, which will escape from the other side. In such an operation, manifestly, the air will be displaced more completely than in an operation which requires the escape of the air through the same surface as that through which the permeating compound has access.

We shall now proceed to a description of a definite mode of procedure; but it will be understood that this description is exemplary merely, and that the invention broadly considered is not limited thereto.

We build up, upon such a hollow core as the spiral tube 3 of Figs. I and II affords, an annular compound conductor 1, of wires stranded over the core, and we envelope the conductor in a body of wrapped-on paper insulation 4. This envelope of insulation is built up, preferably, of manila paper of high grade in strip or ribbon form, wrapped on spirally in superposed layers. A length of cable as thus far built up is put in a large metal container which can be made air tight, and within which when sealed the pneumatic pressure may, by suitable appliances provided for that purpose, be varied. The container is further provided with means for heating it with its contents, and preferably with means for cooling also. The cable is there dried thoroughly, an operation which may be expedited and assisted by sealing the container and reducing the pressure within. If desired, dry air admitted through the hollow core of the cable from the outside may be caused to flow through the as yet unfilled fibrous envelope, to aid in the removal of moisture.

When the envelope has been properly dried, insulating compound is introduced into the hollow core of the cable and the supply contiuues until the hollow is entirely filled. The compound ordinarily employed will be a normally viscid liquid, and its fluidity will ordinarily by heating be increased. The hollow being filled, difference of pressure is established between that exerted through the inner surface of the envelope of paper and that obtaining upon the outer surface. This difference in pressure may be brought about by reducing the pressure within the container, or it may and ordinarily will be brought about by building up pressure on the body of liquid. This may conveniently be done by closing securely the hollow within the cable at one end and applying pressure upon the liquid through the other end. Manifestly, pressure may, if preferred, be applied upon the liquid through both ends at once. Or, again, the desired difference of pressure may be established by the conjoint action of external suction and internal pressure.

After a length of time, which may be from half an hour to an hour, depending upon the thickness of the paper envelope, and upon other conditions of operation as well, the compound will begin to ooze from the outer surface of the envelope, and the compound so oozing out will carry air with it. The air so carried out with the compound will form bubbles on the outer surface of the envelope. After a further lapse of time, say after an hour, air bubbles will cease to appear, but the compound will continue to seep slowly but steadily through.

Our invention in its broadest aspect is thus completed, and it remains only to effect cooling under such conditions as will properly guard against the displacement of the compound within the body of paper by air, —conditions which will be dwelt on in the sequel. To the thus far completed cable such protecting covering or sheath may be applied as may be desired.

Preferably, however, and in application of further features of invention, we proceed further. When the cable in course of fabrication has by the permeation of the compound been practically freed of air, the container may be filled with compound, submerging the cable; and then, assurance having been gained that bubbles of air are not continuing to escape from the outer surface of the paper envelope (if there is such escape of bubbles, the flow of compound from within the cable will be maintained till such escape ceases), the next step is to force through and to fill the hollow conductor with a thicker compound, and then, by continued difference of pressure, to force the heavier centrally lying compound outward until, displacing the lighter compound first introduced, it saturates that portion of the paper envelope which lies nearer the conductor. The object in having the thicker compound in the inner portion of the insulation is to have at that part a substance less apt to run out, in case the cable in service should become unduly warm. Furthermore, as already intimated, a grading here is possible, that the dielectric of the concentrically arranged "waves" or bodies of insulating compound may correspond best to the electrical needs of the structure.

The next step is to force through and to fill the hollow space within the conductor with a very thick heavy compound of the nature of asphalt. When the hollow has been so filled, one end of the cable may be sealed, and the whole cable may then be cooled. While the cooling operation is in progress (and here we come to a consideration of those conditions alluded to above intended to prevent displacement of compound within the body of insulation by air), pressure is applied from within to the whole body of insulation, so as to keep the cable completely filled, to the exclusion of air. At the same time pressure may be applied within the container, so that the thinner softer compound which fills the envelope externally may be forced inward, to fill spaces such as might otherwise develop within the envelope in consequence of contraction of the compound while cooling.

The operation as thus far described may be reversed; the cable in course of construction may, when first placed within the container, be initially immersed in compound, and by proper arrangement of pressures, the flow may be maintained from the exterior surface inward. Ordinarily this alternative will not be resorted to. It is not ordinarily desirable to have the thicker compound on the outside; at the same time, penetration of the thinner compound having been effected from the outside inward (if, for any reason, that were preferable), the direction of flow might then be reversed, and the thicker compound applied from the center, as before.

The pressure difference which will be established on opposite sides of the body of permeable substance in order to facilitate impregnation may vary widely in value, from a pound or two to as much as a hundred and fifty pounds, (and here we do not intend to limit ourselves to particular figures, but only to afford instruction for proper and successful practice of the invention). If the wrapping of paper (the usual permeable material) be but a few turns in thickness, two or three pounds will suffice; if it be deep and massive, the pressure difference will preferably be much greater—and, as we have indicated, the range is wide. It will of course be understood that, given a certain thickness of material to be permeated, permeation will be effected more rapidly if the pressure difference be great than if it be small. The range of possible and practicable pressure difference is wide, even when the thickness of the material to be permeated is fixed.

Referring again to the drawings, it will be observed that a layer consisting conveniently of a few thicknesses of paper 6 is shown, overlying the hollow core and arranged between that member and the conductor 1. This layer of paper is not essential, and it may be left out. Its purpose, when present, is to prevent the heavy asphalt (or other sealing substance), which eventually (according to the more elaborate procedure described above) fills the hollow within the cable, from passing through the conductor 4 and mingling with the compound which has permeated the inner layers of the paper envelope. We recommend the use of this paper layer 6, for it has been found that when the compound commonly employed for paper impregnation is mixed with asphalt, the mixture is dielectrically inferior to the pure compound. But for this (and substances may be employed which are free of this objection) the paper layer 6 may be omitted, and a blending of the filling materials permitted.

We show in Figs. III and IV a conductor made up of concentric layers of copper. The object of this feature is to reduce, when this is desirable, the inductive losses which the iron core may otherwise bring about. (the core 3ᵃ being made ordinarily of iron). The inductance of a conductor consisting of copper wires laid over central iron wires is very greatly reduced by applying in oppositely directed wrap or lay a second layer of copper wires upon the first, for the inductive action of current flowing in one layer in one direction is in such case more or less completely counteracted by that of current flowing in the second layer in opposite direction.

It may in some cases, when dealing with a very thick layer of paper insulation, be desirable to perform the saturation in two operations. In such case part of the paper of the envelope would be applied and saturated by the method described, and cooled, and then the rest of the paper envelope would be applied, and the saturation operation resumed. It is manifest that penetration to the depth of three eighths of an inch, say, may more easily be effected through a wrapping three eighths of an inch thick and no more than into a body half an inch thick. If initially a wrapping three eighths of an inch thick be applied and impregnated and then the additional one eighth be added and impregnation then completed, the whole will have been achieved more easily than if the whole half inch had been wrapped on before impregnation was begun.

When very high voltages have to be transmitted, it is quite important that the surface of the conductor upon which the enveloping insulation lies shall not present sharply rounded areas where dielectric stresses may concentrate, but that this surface shall be uniformly rounded and as gently rounded as conditions shall permit. Accordingly when dealing with bundles of relatively small wires, which small wires together constitute the conductors, it is in high voltage work good practice to mask the surfaces of the small wires of sharp curvature in an all-enclosing envelope of large curvature, this envelope being itself of conducting material. Upon this more gently curving envelope then, rather than directly upon the surfaces of the grouped fine wires, the body of insulation will lie. Accordingly under such conditions as are here suggested the bundle of strands may be wrapped about with tin foil before the insulation is applied. This is well known practice. And it is well known that the tin foil may conveniently be applied in the form of a strip of foil carried on a strip of paper, wrapped on helically. In the practice of our invention it is a fundamental requisite that the built-up cable, before impregnation, shall be permeable from inner surface to outer; and, in order to adapt to the practice of our invention a cable having the feature just dwelt upon,—that is to say, a layer of tin foil overlying the conductors, the strip of foil may be wrapped upon the assembled conductors with spaces left between the edges of successive turns; or, instead, the thin metal employed may to this end be provided with perforations.

If a perforated iron core be employed, such as in shown in Figs. III and IV and described above, then the conductor is magnetizable longitudinally. In this case magnetic action may be neutralized (the conductor consisting of a plurality of layers of wires) by varying the size or the number of wires or the length of lay of the wires in one layer, relatively to the other. It is possible, by designing the cable correctly, to neutralize completely this magnetic effect.

It is a practical matter of first importance that, when by means of difference of pressure insulating compound is being forced through the porous insulation, the connections through which the compound passes to the cable (or through which suction is exerted), do not leak. Proper means for accomplishing this are illustrated in Figs. V and VI of the drawings.

Referring, first, to Fig. V, while the conductor is in course of building, and before the envelope of paper insulation is wrapped on, the conductor 1 is cut away at the end, leaving 3 or 4 inches of the helical core 3 projecting. Over this projecting end of the core a lead tube 7 is slipped, and its inner end brought to abutment upon the end of the conductor 1. The lead tube flares at its free end into a recess shaped to receive it in the socket 8. When the lead tube has been so brought to place, the paper insulation is applied. When all else is ready for the operation of impregnation, socket 8 is united with a plug 9, carried with hermetically tight joint by the hose 10, through which the insulating compound is supplied (or suction exerted). The members 8 and 9 form together a clamp, and the flaring end of lead tube 7 is secured by tight joint between them. All this will be clearly apparent on examining the drawing.

A still better form of joint between the hose and the body to be impregnated is illustrated in Fig. VI. Over the end of the paper-enveloped cable, otherwise completed and ready for impregnation, is slipped a snug-fitting annulus 11, and, following it, a sleeve 12. The sleeve and annulus are threaded to be secured one upon another, and (as they are screwed together) to crush and crowd inward a collar of lead 13 previously placed in position between the two. When these parts are applied and sleeve and annulus screwed together a tight union is made externally upon the outer surface of the cable. The opposite end of sleeve 12 projects beyond the end of the body of paper insulation 4. To this end the hose for injection or for suction is then secured, through a suitable fitting such as 14.

In certain of the ensuing claims we employ the phrase "discrete conducting bodies," in defining the construction of a cable. In that phrase will be included not merely a multiple-conductor cable, a cable in which the conducting bodies are electrically separate as well as physically distinct one from another, but other constructions also will be included; for example, a single-conductor cable whose conductor is made of a plurality of strands of wire, the strands though physically distinct lying in immediate contact one with another, and accordingly not electrically separate. The stranded cable and the multiple-conductor cable also are "hollow" cables, within present contemplation. The hollow space is not to be sure specially provided, as in the cable of Fig. I of the drawings, and it is irregular in shape, and in certain aspects it is not so conveniently arranged; nevertheless the hollow space found in the interstices between the parts of the assembled cable does afford opportunity for the practice of our invention.

The opposite end of the length of cable under treatment may be similarly connected to a source of insulating compound (or suction pump) or it may be sealed over. Further description of means to effect sealing is deemed unnecessary.

We claim as our invention:

1. The method herein described of insulating the conductor of a hollow cable which consists in enveloping the conductor in a body of permeable substance filled with air, and in filling such enveloping body with insulating compound by causing such compound to enter the permeable envelope through one surface while the displaced air escapes through the opposite surface.

2. The method herein described of insulating the conductor of a hollow cable which consists in enveloping the conductor in a body of permeable substance and in then causing a succession of waves of insulating compounds of different quality to penetrate such enveloping body through one surface thereof while the material displaced escapes through the opposite surface.

3. The method herein described of building an electric cable which consists in enveloping a hollow conductor in a body of permeable insulating substance, causing a body of insulating compound to enter said enveloping body through one surface thereof displacing through the opposite surface the material theretofore filling the interstices, then filling the hollow within the tubular conductor with a normally viscid substance temporarily rendered fluid, and finally allowing the substance last mentioned to resume its normally viscid condition.

4. The method herein described of insulating the conductor of a hollow cable which consists in enveloping the conductor in a porous body, establishing conditions of unequal pressure on opposite surfaces of that porous body, and giving a body of insulating material in liquid form access to that surface of the porous body upon which pressure is greater, 5. The method herein described of filling with insulating compound in liquid form a body of fibrous insulation enveloping a plurality of discrete conducting bodies, access being had to the inner surface of such enveloping body of fibrous material through interstices between the conducting bodies, such method consisting in establishing on opposite sides of such body of fibrous insulation unequal conditions of pressure and in causing the insulating compound, flowing under such difference of pressure from one side, to penetrate such fibrous body and penetrating to displace through the opposite side of the fibrous body material theretofore contained in the spaces thereof.

6. The method herein described of building an electric cable which consists in enveloping a hollow conductor in a body of permeable insulating substance, causing a body of insulating material in fluid condition to permeate such enveloping body from one surface thereof displacing from the opposite surface in its advance the air thitherto filling the interstices thereof, and finally applying to the so insulated cable a protective covering.

7. The method herein described of building an electric cable which consists in surrounding a hollow conductor in an envelope of permeable insulating material, placing the thus far assembled cable in a container, introducing in liquid condition into the hollow within the cable a filling substance of normally viscid nature rendered liquid by heat and maintaining inequalitiy of pressure upon the liquid so introduced and upon the exterior surface of the cable until the filling substance has impregnated the envelope, filling the container while the cable continues within it with liquid insulating material, and allowing the cable to cool while so submerged.

8. The method herein described of building an electric cable which consists in laying exteriorly upon a paper tube the conducting elements of a cable, surrounding the parts so assembled in an envelope of permeable insulating material, causing insulating compound in liquid state introduced within the said paper tube to penetrate the tube walls and to permeate the insulating material of the surrounding envelope, and finally filling the tube with a substance with respect to which the paper of the tube is a barrier and which when so filling the tube constitutes a barrier against the escape of insulating compound from the insulating envelope through the tubular paper wall.

9. An electric cable including in its structure a plurality of conducting wires assembled externally upon a tube of paper, an envelope of permeable material enclosing the aforesaid assembly, the material of said envelope being permeated with insulating compound, and a body of viscid substance with respect to which the paper of said tube is impervious filling said tube and constituting a barrier against the escape of insulating compound from said envelope through the walls of said tube, substantially as described.

In testimony whereof we have hereunto set our hands.

HENRY W. FISHER.
RALPH W. ATKINSON.

Witnesses:
EDITH GARIS,
GEORGE J. SHURTS